United States Patent Office 2,746,984
Patented May 22, 1956

2,746,984

PROCESS FOR THE SEPARATION OF ALIPHATIC ALCOHOLS FROM HYDROCARBON-ALCOHOL MIXTURES

Walter Rottig, Oberhausen-Sterkrade-Nord, Germany, assignor to Ruhrchemie Aktiengesellschaft, Oberhausen-Holten, and Lurgi Gesellschaft für Wärmetechnik m. b. H., Frankfurt am Main Heddernheim, Germany, a German corporation No Drawing. Application June 22, 1951, Serial No. 233,102

5 Claims. (Cl. 260—450)

This invention relates to a process for the separation of aliphatic alcohols from hydrocarbon-alcohol mixtures.

It more particularly relates to the separation of aliphatic alcohols from hydrocarbon-alcohol mixtures obtained in catalytic hydrogenation of carbon monoxide.

Synthesis products from the catalytic hydrogenation of carbon monoxide with suitable catalysts consists in addition to hydrocarbons largely of oxygenous carbon compounds such as aliphatic alcohols. The products obtained from the catalytic addition of carbon monoxide and hydrogen to olefinic hydrocarbon mixtures also contain aliphatic alcohols. These aliphatic alcohols are separated from the other hydrocarbons produced from the synthesis in the form of their boric acid esters. For this purpose, the hydrocarbon mixture to be processed is mixed with boric acid to the degree required whereupon the water formed by the reaction is distilled off. The distillation of this water if necessary may be effected with the addition of a component which will form a mixture having an azeotropic boiling point, as for example, heptane.

In this procedure, it has been the conventional practice after the termination of the alcohol esterification to separate the boric acid ester from the rest of the organic compounds which consist chiefly of hydrocarbons by vacuum distillation. This distillation is also partly effected with the admixture of a component capable of forming an azeotropic mixture. The separated boric acid esters are easily decomposed into free alcohols and boric acid by the injection of steam.

This known process for the separation of alcohol has the decided disadvantage that in spite of the use of a vacuum during distillation, it is impossible to avoid rather high temperatures, especially when high molecular alcohols have to be separated from high molecular hydrocarbons. The boric acid esters of high-molecular alcohols are frequently subjected in this process to an undesirable decomposition which leads to the formation of olefines or polymerization products.

One object of this invention is the separation of boric acid esters from hydrocarbon mixtures without the aforementioned difficulties. This, and still further objects will become apparent from the following description and the examples.

It has now been found, according to the invention, that these disadvantages can be avoided and an especially smooth and simple separation of the aliphatic alcohols can be obtained if the hydrocarbon-alcohol mixture esterified by boric acid is extracted by solvents which preferably dissolve the boric acid esters. After the extraction, the extract solution is separated from the remaining carbon compounds through the formation of layers. The separated extract solution is treated with steam before or after distilling off the extraction medium and is finally decomposed by distillation into boric acid and alcohol.

Methanol has been found especially suitable for the extraction according to the invention. However, it is also possible to use alcohols of higher molecular weight in which case, as may be appropriate, larger or smaller amounts of water may be added. Besides monovalent alcohols, such solvents as glycol and its derivatives, glycerine and its homologues, polyvalent alcohols, aromatic and aliphatic amino compounds are suitable for the extraction of the boric acid esters.

The esterification mixture obtained through the addition of boric acid can be extracted in stages or continuously with the compounds named. It is best to do the work in several stages in a counter-flow. It has been found advantageous to utilize the solvent power of the methanol or other solvents only to a limited extent. When the saturation with boric acid esters within the extraction medium has reached a certain degree, the equilibrium of the solvent medium is so displaced that larger or smaller quantities of hydrocarbon pass over into the extraction agent. The selectivity of the extraction process is considerably disturbed thereby.

The solvents saturated with the boric acid esters such as the boric acid ester-methanol solution, are separated from the hydrocarbons and other carbon compounds present through the formation of layers. The separated extraction solution may be immediately processed to obtain the alcohols. At first the methyl alcohol or other solvent used as the extraction medium is distilled off and then the remaining boric acid ester is decomposed by steam in the usual manner. However, it is also possible to inject steam directly into the extraction solution and split the same into boric acid, alcohols and the extraction medium. The whole mixture may then be separated under normal or reduced pressure into the individual alcohols, extraction medium and boric acid. The extraction medium and the boric acid can be returned for further use in the process.

If the extraction of the boric acid esters is carried out with glycol and similar bivalent and polyvalent alcohols such as butylene glycol, azeotropic mixtures of alcohols of a higher molecular weight are frequently formed. When using extraction media of this kind, the extraction solution is diluted with water after separation of the hydrocarbon phase. In this process a separation into layers of boric acid esters and an aqueous alcohol phase occurs. The boric acid esters are drawn off and decomposed into alcohols and free boric acid in the known manner.

The aqueous glycol solution is worked up by distillation which is carried out at normal or nearly normal pressure, whereupon the glycol is returned into circulation for reuse in new extractions.

The following examples are given to illustrate the invention and not to limit the same, the invention being limited by the appended claims or their equivalents.

*Example 1*

A fraction with a boiling point between 200–320° C. was separated out of the synthesis products of a carbon monoxide hydrogenation which formed chiefly oxygenous compounds. 6600 cc. of this fraction were esterified in the usual manner with 200 gm. of boric acid using 350 cc. of heptane, in which process the heptane served as the azeotropic carrier in the removal of the water of reaction.

1000 cc. of this esterification mixture were extracted with 5000 cc. of 90% methanol in a counter-flow process in four stages. This yielded 5330 cc. of an extraction solution, which was freed from the methanol by a distillation carried out at atmospheric pressure. The distillation residue consisted of a lower aqueous phase and an upper ester phase. The ester phase was split in the usual manner with super-heated steam. Thereby 315 cc. of an alcoholic mixture were separated with a hydroxyl number of 260. By a distillation immediately following, $C_{10}$–$C_{15}$ alcohols with a degree of purity of 93–95% were obtained. The hydrocarbon phase split off after the extraction contained practically no boric acid esters.

Whenever the extraction of the boric acid esters according to the invention was carried out in such a manner that the last stage of extraction was started with pure methanol and small amounts of water were added in each stage so that a 90% methanol was present during the first stage of extraction, an alcohol mixture with an OH number of 279 could be obtained. It was possible to obtain out of this, by subsequent distillation, extracted alcohols of 95–96% purity.

Whenever the extraction of the boric acid esters was carried out with butylene glycol, instead of methanol, the isolated alcohol mixture had an OH number of 283 and yielded by distillation individual alcohols of 97–98% purity.

*Example 2*

The oxygenous hydrocarbon mixture used in Example 1 was treated in a counter-flow extraction of 5 stages by means of a column with a solvent mixture consisting of methanol, 10% of butylene alcohol and 5% of aniline. 6 parts by volume of the solvent per 1 part by volume of the esterification mixture were used. The end product obtained was an alcohol mixture which had a hydroxyl number of 285 and practically no neutralization number or saponification number. The $C_{10}$–$C_{15}$ alcohols present in the starting material could be obtained with a purity of 98–99% through distillation.

*Example 3*

1000 cc. were extracted from the boric acid ester-hydrocarbon mixture obtained according to Example 1 in four stages in a counter-flow with the quintuple amount of a mixture which consisted of 82% of methanol, 10% of butylene glycol and 8% of a primary aliphatic $C_{11}$-amine. The subsequent processing and decomposition of the extracted boric acid ester yielded an alcohol mixture with an OH-number of 276. There was practically no neutralization or saponification number. Distillative treatment yielded $C_{10}$–$C_{15}$ alcohols with a purity of approximately 97%.

*Example 4*

1000 cm.³ of the mixture of boric acid esters mentioned in Example 1 were continuously extracted with a mixture consisting of 80% of ethanol and 20% of glycol, using a four stage extraction apparatus. 5.5 parts by volume of the ethanol-glycol mixture per 1 part by volume of the ester-hydrocarbon mixture were used. After distilling off the ethyl alcohol, at first a wash was done three times with a quantity of water equal to the quantity of glycol present in order to remove the glycol as complete as possible. Then the mixture was saponified by blowing in hot water vapor; the lower phase contained the boric acid, the upper layer consisted of alcohols.

The subsequent distillative treatment yielded alcohols with a purity of approximately 95–96%.

I claim:

1. In the method for the separation of aliphatic alcohols from mixtures of hydrocarbons and alcohols obtained from the catalytic hydrogenation of carbon monoxide, through the esterification of such mixtures with boric acid, the improvement which comprises contacting such an esterified mixture with a solvent capable of extracting the boric acid esters comprising a member selected from the group consisting of liquid alcohols and amines, said contacting being carried out to a point at which said solvent is not completely saturated with the boric acid esters to thereby form an extract solution substantially free from hydrocarbons, separating the extract solution from the remaining hydrocarbons by the formation of layers, treating the boric acid esters with steam, and recovering aliphatic alcohols by distillation.

2. Improvement according to claim 1, in which the boric acid esters are treated with steam while in the extraction solution, the extraction medium then being distilled off and the alcohol recovered by distillation.

3. Improvement according to claim 1, in which the solvent is distilled from the separated extraction medium and thereafter the boric acid ester is treated with steam and the alcohol recovered by distillation.

4. Improvement according to claim 1, in which said contacting with the solvent is effected in several stages in counter-flow.

5. Improvement according to claim 1 in which said solvent comprises methanol.

References Cited in the file of this patent

UNITED STATES PATENTS

| | | |
|---|---|---|
| 1,886,885 | Kaufmann | Nov. 8, 1932 |
| 1,947,989 | Hellthaler et al. | Feb. 20, 1934 |
| 2,288,769 | Alleman et al. | July 7, 1942 |
| 2,587,753 | O'Connor et al. | Mar. 4, 1952 |

OTHER REFERENCES

U. S. Naval Technical Mission Report (No. 248–45) (PB–22841), pp. 86 to 88. Received August 27, 1947.